(12) United States Patent
Yang et al.

(10) Patent No.: US 11,740,250 B2
(45) Date of Patent: Aug. 29, 2023

(54) DEVICE FOR REAL-TIME ONLINE ANALYSIS OF SUBSTANCE PYROLYSIS AND METHOD OF USING THE SAME

(71) Applicant: CHINA TOBACCO YUNNAN INDUSTRIAL CO., LTD., Kunming (CN)

(72) Inventors: Ji Yang, Kunming (CN); Jianjun Xia, Kunming (CN); Jianhua Yao, Kunming (CN); Jinyun Liu, Kunming (CN); Zhijiang Yin, Kunming (CN); Chunbo Liu, Kunming (CN); Shiyun Tang, Kunming (CN); Wei Jiang, Kunming (CN); Zhenjie Li, Kunming (CN); Yiqin Wu, Kunming (CN); Meng Li, Kunming (CN); Zhouhai Zhu, Kunming (CN); Yanqun Xu, Kunming (CN); Zhihua Liu, Kunming (CN)

(73) Assignee: China Tobacco Yunnan Industrial Co., LTD., Kunming (CN)

( * ) Notice: Subject to any disclaimer, the term of this patent is extended or adjusted under 35 U.S.C. 154(b) by 0 days.

(21) Appl. No.: 18/163,142

(22) Filed: Feb. 1, 2023

(65) Prior Publication Data

US 2023/0213538 A1 Jul. 6, 2023

Related U.S. Application Data

(63) Continuation of application No. PCT/CN2021/143565, filed on Dec. 31, 2021.

(30) Foreign Application Priority Data

Dec. 22, 2021 (CN) .......................... 202111578066.5

(51) Int. Cl.
*G01N 35/02* (2006.01)
*G01N 35/04* (2006.01)
(Continued)

(52) U.S. Cl.
CPC ..... *G01N 35/00584* (2013.01); *G01N 35/025* (2013.01); *G01N 30/06* (2013.01);
(Continued)

(58) Field of Classification Search
CPC .......... G01N 35/00584; G01N 35/025; G01N 2030/125; G01N 2030/126; G01N 30/06; G01N 30/02; G01N 30/12
See application file for complete search history.

(56) References Cited

U.S. PATENT DOCUMENTS 4,325,907 A * 4/1982 Dembicki, Jr. ........ G01N 30/00
422/89
4,408,656 A * 10/1983 Levenspiel ............... F28C 3/14
165/909

(Continued)

FOREIGN PATENT DOCUMENTS

CN 102735786 A 10/2012
CN 104950065 A 9/2015
(Continued)

OTHER PUBLICATIONS

International Search Report dated Sep. 20, 2022; International Application No. PCT/CN2021/143565 International Filing Date Dec. 31, 2021; 4 pages; China National Intellectual Property Administration (ISA/CN), Beijing, China.
(Continued)

*Primary Examiner* — Kristina M Deherrera
*Assistant Examiner* — Fatemeh Esfandiari Nia
(74) *Attorney, Agent, or Firm* — Andrew D. Fortney; Central California IP Group, P.C.

(57) ABSTRACT

A real-time online analysis device for substance pyrolysis, including: a pyrolyzing system (1), a capturing system (2), a testing system (3) and a controlling system (4) is disclosed. The pyrolyzing system (1), the capturing system (2) and the
(Continued)

testing system (3) are connected with the controlling system (4). The capturing system (2) has a cooling cavity (22) and a heating cavity (23) inside. The temperature of the cooling cavity (22) ranges from room temperature to −200° C., and the temperature of the heating cavity (23) ranges from room temperature to 1000° C. A method for real-time online analysis of substance pyrolysis using the device is also disclosed. The present device can provide real-time online pyrolysis, capturing, separation and analysis of substances at a plurality of temperature points or ranges.

7 Claims, 8 Drawing Sheets

(51) Int. Cl.
*G01N 30/12* (2006.01)
*G01N 30/06* (2006.01)
*G01N 35/00* (2006.01)

(52) U.S. Cl.
CPC .................. *G01N 2030/125* (2013.01); *G01N 2035/00346* (2013.01); *G01N 2035/0441* (2013.01)

(56) References Cited

U.S. PATENT DOCUMENTS

| | | | | |
|---|---|---|---|---|
| 5,866,072 | A | * | 2/1999 | Bowe, Jr. ............... G01N 31/12 422/78 |
| 6,245,298 | B1 | * | 6/2001 | Bremer .................. G01N 30/12 422/68.1 |
| 11,467,135 | B2 | | 10/2022 | Chen et al. |
| 2020/0400622 | A1 | | 12/2020 | Chen et al. |
| 2021/0364483 | A1 | * | 11/2021 | Gao ....................... G01N 30/12 |

FOREIGN PATENT DOCUMENTS

| | | | |
|---|---|---|---|
| CN | 108627369 | A | 10/2018 |
| CN | 208313912 | U | 1/2019 |
| CN | 110333127 | A | 10/2019 |
| CN | 111487357 | A | 8/2020 |
| CN | 111751479 | A | 10/2020 |
| CN | 211978494 | U | 11/2020 |
| CN | 113083190 | A | 7/2021 |
| GB | 2288339 | A * 10/1995 | ........... B01D 5/0036 |
| JP | 2000009711 | A | 1/2000 |

OTHER PUBLICATIONS

International Search Report dated Jul. 26, 2021; International Application No. PCT/CN2020/141588; International Filing Date Dec. 30, 2020; 2 pages; China National Intellectual Property Administration (ISA/CN), Beijing, China.

* cited by examiner

DEVICE FOR REAL-TIME ONLINE ANALYSIS OF SUBSTANCE PYROLYSIS AND METHOD OF USING THE SAME

CROSS-REFERENCE TO RELATED APPLICATIONS

This application is a continuation of International Pat. Appl. No. PCT/CN2021/143565, filed on Dec. 31, 2021, which claims the benefit of Chinese Pat. Appl. No. 202111578066.5, filed on Dec. 22, 2021, both of which are incorporated herein by reference as if fully set forth herein.

FIELD OF THE INVENTION

The present invention belongs to the field(s) of analysis and detection, and in particular, to the technical field of a device for real-time online analysis of substance pyrolysis and a method of using the device.

DISCUSSION OF THE BACKGROUND

Many inorganic and organic substances decompose when they are heated to a certain extent. Organic pyrolysis processes with industrial significance often have different names due to specific processes. Pyrolysis reactions in isolated air are called dry distillation, e.g., coal dry distillation and wood dry distillation. The process of methane pyrolysis to produce carbon black is called thermal decomposition. Pyrolysis of an alkylbenzene or alkylnaphthalene to produce benzene or naphthalene is often called thermal dealkylation. Production of ketene from acetone is called acetone cracking. Pyrolysis of hydrocarbons is often distinguished as thermal cracking and decomposition.

Real-time online analysis of the products obtained during pyrolysis is of great significance for controlling reaction processes, optimizing reaction conditions, and changing reaction substances. For instance, tobacco is a biomass with complex components, and its pyrolysis products have a crucial impact on cigarette quality. Studies show that 1/3 of chemical components in cigarette smoke directly derive from tobacco, and the rest are produced in a series of complex processes such as distillation, decomposition, burning and polymerization during cigarette burning. Thus, establishing a model system suitable for analysis of tobacco biomass pyrolysis and for studying pyrolysis and migration of tobacco components at any temperature may be beneficial.

The prior art mainly uses thermogravimetric-differential thermal analysis (TG/DTA) and pyrolyzer-gas chromatography/mass spectrometry (Py-GC/MS) to study the tobacco pyrolysis process. Py-GC/MS is used mainly for studying rapid decomposition of substances at a temperature point, followed by analysis of the pyrolysis products. Currently, it is impossible to investigate the whole process of pyrolysis of substances with temperature changes. For non-volatile substances in tobacco (e.g., sugars, amino acids, polyphenols, etc.), pyrolysis products at a single temperature are obtained. Thus, it is difficult to recognize compound pyrolysis at a specific temperature or over a temperature range with such information. Besides, since the content of pyrolysis products obtained by pyrolysis is low, generally at the nanogram level, even less than residual substances, as pyrolysis products go through gas chromatography-mass spectrometry analysis, there may exist qualitative and quantitative inaccuracies.

TG/DTA can provide stable reaction conditions during programmed heating, which is the most ideal experimental tool in tobacco pyrolysis research. However, specific substances and their content of tobacco pyrolysis cannot be obtained only using TG/DTA, and other devices must be combined to analyze thermogravimetric escaped components. However, there is still a lack of an effective combined device for analysis of thermogravimetric escaped components, thus seriously restricting application of thermogravimetric analysis in tobacco pyrolysis research. It is still difficult for the current commercially available combined systems to play a key role in tobacco pyrolysis research due to the following facts: thermogravimetric-mass spectrometry (TG-MS) has not yet realized analysis of overlapping peaks; it is difficult to identify compounds with the same functional groups by thermogravimetric analysis-Fourier transform infrared spectroscopy (TG-FTIR) or thermogravimetric analysis-Fourier transform infrared spectroscopy-mass spectrometry (TG-FTIR-MS); and substances in the substance pyrolysis process are collected at the infrared peak, so real-time substance collection at a certain temperature point or range cannot be achieved. In order to study substance pyrolysis at any temperature point or range, it is necessary to set experimental conditions at certain temperature points to carry out separate experiments in the prior art, e.g., analysis of pyrolysis products and their content at eight temperature points or ranges in the whole process requires eight experiments, which is time-consuming and a waste of resources.

It is reported that, by switching of a six-way valve or eight-way valve, targeted pyrolysis products can be captured for subsequent analysis. However, the escaped decomposition gas from the substances has a certain temperature, and switching of the valve at room temperature can easily condense the escaped pyrolysis products in the valve, causing contamination of the valve. The captured substances may also be those condensed after a plurality of experiments, thus analysis results are not reliable.

Online analysis of complex escaped components of substance pyrolysis through a single experiment at several temperature points or ranges is a key problem that needs to be solved in current substance pyrolysis research.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention aims to solve the above-mentioned problems.

The present invention provides a real-time online analysis device for substance pyrolysis. The capturing system of the device has a cooling cavity and a heating cavity. The cooling cavity can condense, adsorb and capture pyrolysis products at set or predetermined temperature points or ranges, and the heating cavity can thermally desorb the pyrolysis products, enabling real-time online separation and analysis.

The technical solutions of the present invention are as follows:

A first aspect of the present invention concerns a real-time online analysis device for substance pyrolysis, including: a pyrolyzing system, a capturing system, a testing system and a controlling system. The pyrolyzing system, the capturing system and the testing system are connected with the controlling system. The controlling system controls pyrolysis of the substance, capture of the pyrolysis products, as well as real-time separation and analysis. The capturing system has a cooling cavity and a heating cavity. The cooling cavity has a temperature range from room temperature to −200° C., and the heating cavity has a temperature range from room temperature to 1000° C.

Preferably, the capturing system includes the following components.

A horizontal moving slot;

A cooling cavity at one end of the horizontal moving slot 21, the cooling cavity having (i) a cooling tube connected to a cooling gas device, (ii) an airtight connection with the pyrolyzing system through a first gas pipeline 5, and (iii) a length no less than that of a collecting tube;

A heating cavity at another end of the horizontal moving slot, having (i) a heating tube, (ii) an airtight connection with the testing system through a second gas pipeline (which may be the same as or different from the first gas pipeline), and (iii) a length no less than that of the collecting tube;

A rotary collector 24 on the horizontal moving slot between the cooling cavity and the heating cavity, which can slide along the horizontal moving slot towards the cooling cavity or the heating cavity, wherein the sliding distance is no less than the length of the collection tube, and the rotary collector can rotate 360° clockwise or counterclockwise;

A plurality of the collecting tubes on the rotary collector, on a radius or circumference of the rotary collector;

A purging gas pipe 25 having one end connected to the rotary collector, and another end connected to a purging gas cylinder.

Preferably, the cooling gas device contains liquid nitrogen, and the cooling temperature ranges from room temperature to −200° C.; and the heating tube 231 may be heated at a rate in a range of 1° C./s~300° C./s.

Preferably, the pyrolyzing system includes a pyrolyzing device or chamber with programmed or programmable heating (e.g., from the controlling system). The pyrolyzing device is configured to receive a carrier gas, which can be one or more of air, nitrogen, oxygen, helium, and argon. The carrier gas can have a flow rate of 0~2000 mL/min. The pyrolyzing system can collect substances during weight loss, heat flux, enthalpy and other programs in real-time. Preferably, the present analysis device includes a comprehensive thermal analyzer (which can be selected, for example, by the controlling system). The pyrolyzing system can set a plurality of temperatures or temperature ranges based on the substance pyrolysis temperature. The temperatures are set by the controlling system (e.g., using a temperature setting program).

Preferably, the testing system includes a separation device and a detection device. One end of the separation device has an airtight connection with the heating cavity through the first or second gas pipeline, and another end of the separation device is connected to the detection device.

Preferably, the separation device includes but is not limited to a gas chromatograph, and the detection device includes but is not limited to a mass spectrometer.

Preferably, the purging gas in the purging gas pipe is one of nitrogen, helium or argon, and the purging gas may flow at a rate of 0-2000 mL/min.

Preferably, there are no less than eight collection tubes in the present analysis device.

A second aspect of the present invention concerns a method for real-time online analysis of substance pyrolysis using the device mentioned above, including the following steps:

Place the substance(s) to be analyzed in the pyrolyzing device, and when the temperature reaches a set or predetermined temperature or temperature range under the control of the controlling system, heat the substance(s) at the set or predetermined temperature or temperature range to generate pyrolysis products;

Move the rotary collector along the horizontal moving slot towards the cooling cavity, and extend a collection tube into the cooling cavity;

Bring the pyrolysis products into the collection tube using the carrier gas;

Cool the carrier gas (e.g., using the cooling tube) to condense the pyrolysis products and adsorb the pyrolysis products in the collection tube;

After collecting the pyrolysis products at the temperature or temperature range, rotate the collecting tube (e.g., by 180°) using the rotary collector, and move the rotary collector along the horizontal moving slot towards the heating cavity;

Extend the collecting tube with the pyrolysis products therein into the heating cavity, and heat the heating cavity (e.g., using the heating tube) to thermally desorb the pyrolysis products from the collecting tube, Feed the pyrolysis products into the separation device (e.g., using the purging gas in the purging gas pipe) to separate the pyrolysis products, and Analyze the pyrolysis products online using the detection device.

The method may further comprise pyrolyzing (e.g., heating) the substance(s) at one or more other temperatures or temperature ranges, and otherwise repeating the above method to obtain or carry out real-time online analysis of substance pyrolysis at a plurality of set temperatures or temperature ranges.

The present invention has the following beneficial effects:

1. The device of the present invention can provide real-time online capture, separation and analysis at a plurality of temperature points or ranges for one-time substance pyrolysis. The device of the present invention can detect and analyze real-time temperature-dependent changes in substance pyrolysis products, as well as changes of pyrolysis product content as a function of temperature changes.

2. The device of the present invention rapidly captures pyrolysis products in the substance pyrolysis process by cooling, then separates and analyzes them by thermal desorption in a closed, integrated experimental system, including the whole process of programmed heating pyrolysis, cold-trap capture, thermal desorption, and automatic injection, separation and analysis, so that substance pyrolysis at a slower heating rate can be studied, as well as qualitative and relative quantitative analysis of pyrolysis product components of various substances, thereby enabling, obtaining and/or providing real-time variation of the pyrolysis components.

3. The present invention uses several rotatable collection tubes to capture pyrolysis products at several temperatures or temperature ranges in a cold trap, then feeds them into the separation system and the detection system through high-temperature thermal desorption. The use of cold-trap capture effectively avoids occurrence of secondary reactions of pyrolysis products during high-temperature processes at the capturing stage. The application of high-temperature thermal desorption effectively avoids condensation of pyrolysis products at the analysis stage in the conveying pipes or valves, thus greatly improving reliability of capturing and analyzing substances, as well as accuracy of the analysis method.

4. The device of the present invention, by combining a kinetic study using programmed heating of the pyrolyzing device, can sort and analyze thermochemical reactions of substances while monitoring substance pyrolysis, and establish a thermochemical reaction model for pyrolysis chemical reactions by controlling the reaction process, optimizing reaction conditions and changing reaction substances, so that pyrolysis reactions may be carried out in a beneficial direction under controllable conditions.

These and other advantages of the present invention will become readily apparent from the detailed description of various embodiments below.

Figure 1:
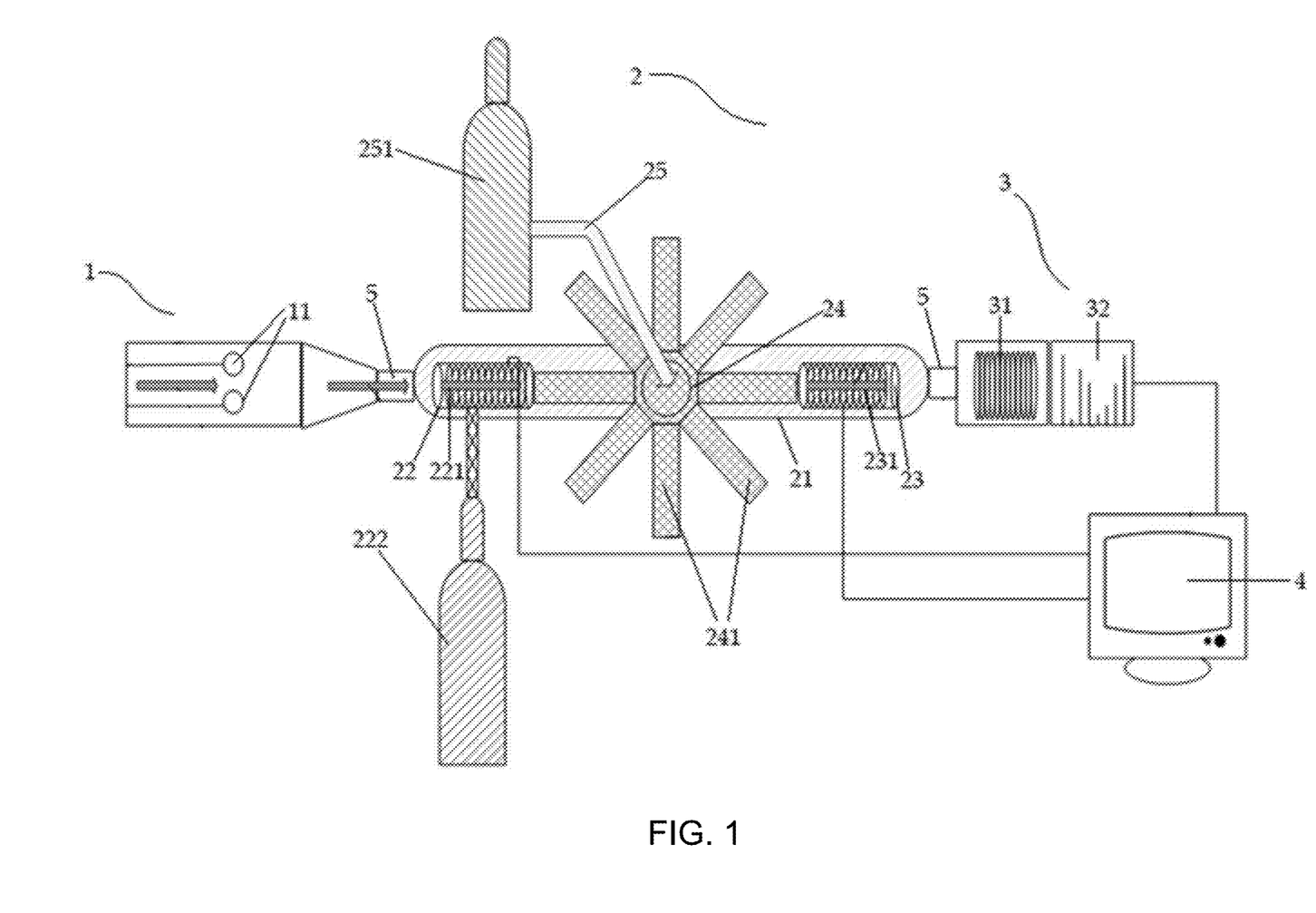
FIG. 1 is a schematic view of the device for substance pyrolysis real-time online analysis of the present invention; the arrow direction in the pyrolyzing system is the flowing direction of carrier gas.

Identification of components in the drawings: 1. A pyrolyzing system; 11. A pyrolyzing device; 2. A capturing system; 21. A horizontal moving slot; 22. A cooling cavity; 221. A cooling tube; 222. A cooling gas device; 23. A heating cavity; 231. A heating tube; 24. A rotary collector; 241. A collection tube; 25. A purging gas pipe; 251. A purging gas cylinder; 3. A testing system; 31. A separation device; 32. A detection device; 4. A controlling system; 5. A gas pipeline.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

In order to make the purpose, technical solutions and beneficial effects of the present invention clearer, the following will be illustrated in detail in combination with the embodiments to facilitate the understanding of persons skilled in the art.

The present invention is further illustrated below by the embodiments, but not limited to the embodiments. Experimental methods with no specific conditions in the embodiments, are usually in accordance with the conventional conditions and conditions described in the manual, or general equipment, materials, reagents, etc. used in the conditions recommended by manufacturers, unless otherwise specified, are available commercially. Raw materials used in the following embodiments and comparison(s) are all commercially available.

A real-time online analysis device for substance pyrolysis is shown in FIG. 1, including: a pyrolyzing system 1, a capturing system 2, a testing system 3 and a controlling system 4. The pyrolyzing system 1, the capturing system 2 and the testing system 3 are connected with the controlling system 4. The controlling system 4 controls pyrolysis throughout the entire device, capturing of pyrolysis products, and real-time separation and analysis. The capturing system 2 has a cooling cavity 22 and a heating cavity 23 therein, the cooling cavity 22 has a temperature range from room temperature to −200° C., and the heating cavity 23 has a temperature range from room temperature to 1000° C.

The capturing system 2 includes the following components: a horizontal moving slot 21; a cooling cavity 22 at one end of the horizontal moving slot 21; the cooling cavity 22 has a cooling tube 221, which is connected to a cooling gas device 222; the cooling cavity 22 is in airtight connection with the pyrolyzing system 1 through a first gas pipeline 5; the cooling cavity 22 has a length no less than that of a collecting tube 241; a heating cavity 23 at the other end of the horizontal moving slot 21; the heating cavity 23 has a heating tube 231; the heating cavity 23 is in airtight connection with the testing system 3 through a second gas pipeline 5; the heating cavity 23 has a length of no less than that of the collecting tube 241; a rotary collector 24 on the horizontal moving slot 21 between the cooling cavity 22 and the heating cavity 23, which can slide along the horizontal moving slot 21 towards the cooling cavity 22 or the heating cavity 23, the sliding distance may be no less than the length of the collection tube 241; and a plurality of collecting tubes 241 on the rotary collector 24, on or along the radius of (e.g., arranged radially on) the rotary collector 24. Preferably, there are no less than eight collection tubes 241 on the rotary collector 24. The rotary collector 24 can rotate 360° clockwise or counterclockwise. One end of a purging gas pipe 25 is connected to the rotary collector 24; the other end of the purging gas pipe 25 is connected to the purging gas cylinder 251.

The cooling gas device 222 contains liquid nitrogen, and the cooling temperature ranges from room temperature to −200° C. The heating tube 231 has a temperature range from room temperature to 1000° C., and can be heated at a rate in the range of 1° C./s 300° C./s.

The pyrolyzing system 1 includes a pyrolyzing device 11 capable of being programmed for heating. A carrier gas (not shown) is introduced into the pyrolyzing device 11, which can be one or more of air, nitrogen, oxygen, helium, and argon. The flow rate of the carrier gas is 0~2000 mL/min. The pyrolyzing system 1 can collect substances during weight loss, heat flux, enthalpy and other programs in real-time. Preferably, the pyrolyzing system 1 includes a comprehensive thermal analyzer (not shown). The pyrolyzing system 1 can set a plurality of temperatures or temperature ranges for pyrolysis of the substance, and the program for setting the pyrolysis temperatures or temperature ranges is in the controlling system 4.

The testing system 3 includes a separation device 31 and a detection device 32. One end of the separation device 31 is in airtight connection with the heating cavity 23 through the gas pipeline 5, and the other end of the separation device 31 is connected with the detection device 32. Preferably, the separation device 31 includes but is not limited to a gas chromatograph, and the detection device 32 includes but is not limited to a mass spectrometer.

The purging gas in the purging gas pipe 25 is one of nitrogen, helium and argon. The purging gas flow rate is 0-2000 mL/min.

The method for real-time online analysis of substance pyrolysis using the device of the present invention includes the following steps:

Place the pyrolysis substance(s) to be analyzed in the pyrolyzing device 11, and when the temperature reaches a set temperature or temperature range (e.g., under the control of the controlling system 4), the substance(s) in the pyrolyzing device 11 are heated at the set temperature or temperature range for pyrolysis.

The rotary collector 10 moves along the horizontal moving slot 21 towards the cooling cavity 22, and extends a collection tube 241 into the cooling cavity 22. Pyrolysis products are brought into the collection tube 241 by the carrier gas, and the cooling tube 221 cools the carrier gas to condense the pyrolysis products and adsorb the pyrolysis products in the collection tube 241. After collecting the pyrolysis products, the collecting tube 241 is withdrawn from the cooling cavity 22 and rotated (e.g., 180°) by the rotary collector 10, which moves along the horizontal moving slot 21 towards the heating cavity 23.

The collecting tube 241 with the pyrolysis products therein is extended into the heating cavity 23, and the heating tube 231 heats the heating cavity 23. Heating the pyrolysis products in the collecting tube 241 thermally desorbs them from the collecting tube 241. The desorbed pyrolysis products are fed and/or carried by the purging gas from the purging gas pipe 25 into the separation device 31, which separates the desorbed pyrolysis products. After separation, the separated pyrolysis products enter the detection device 32 and are analyzed by the detection device 32, then online by a user at the control device (e.g., computer 4 with monitor, mouse and keyboard).

Then, the pyrolysis and analysis method is repeated for the same substance(s) at other pyrolysis temperatures or temperature ranges. By repeating the above steps, real-time online analysis of substance pyrolysis at a plurality of set temperatures or temperature ranges can be carried out.

The present invention will be described in further detail below in conjunction with the accompanying drawings and embodiments, but the accompanying drawings and embodiments are not intended to limit the technical solutions of the present invention, and all changes or equivalent substitutions made based on the teachings of the present invention shall belong to the present invention's protection scope.

Examples

Embodiment 1: Real-Time Online Analysis of Pyrolysis of a Brand of Cigarette Tobacco Material a Using the Device of the Present Invention Before substance pyrolysis analysis, the pyrolyzing device 11 is kept at 800° C. for 10 min to remove impurities in the pyrolyzing device 11. A brand of cigarette tobacco material A weighing 5.00 mg is placed in the pyrolyzing device 11. The heating program is as follows: increase the initial temperature from 30° C. to 900° C. at the rate of 5° C./min, hold for 10 min. The carrier gas is air, and the carrier gas flow rate is 50 mL/min. Thermogravimetric, heat flux and derivative thermogravimetric analysis of the tobacco material A are shown in FIG. 2.

Figure 2:
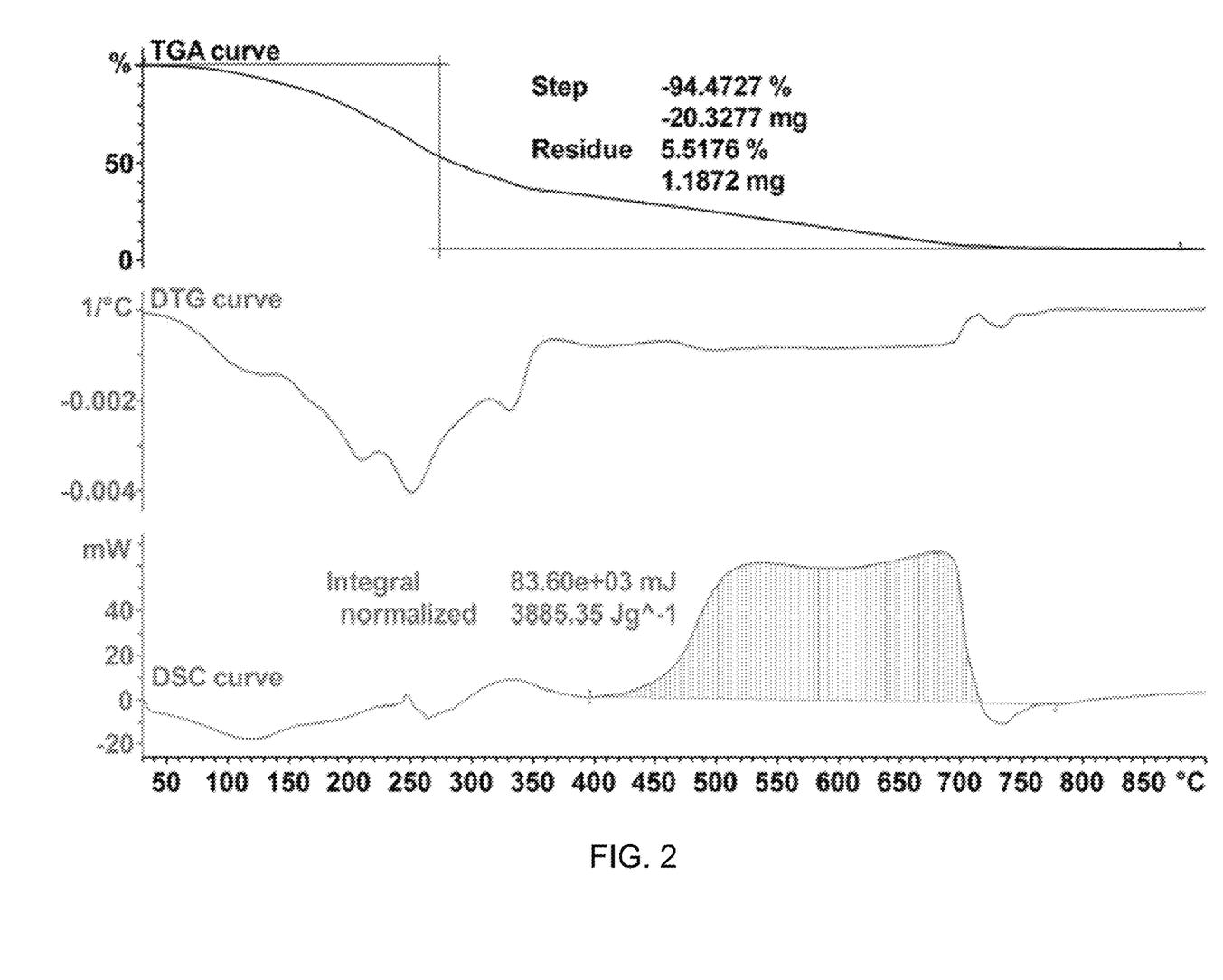
FIG. 2 shows thermogravimetric, heat flux and derivative thermogravimetric analysis of a cigarette brand tobacco material A of embodiment 1.

As is shown in FIG. 2, the program of sixteen temperature ranges of main thermal weight-loss steps of the tobacco material is shown in Table 1. The device included and/or used sixteen collection tubes, and sixteen groups of pyrolysis products at various temperature ranges were collected during the heating program. Liquid nitrogen is used to rapidly cool the pyrolysis products in the collection tube at a cooling temperature of −80° C.

TABLE 1

Capturing tube collection number and corresponding temperature range in the pyrolysis of tobacco material A

| | Capturing Tube No. | | | | | | | |
| --- | --- | --- | --- | --- | --- | --- | --- | --- |
| | 1 | 2 | 3 | 4 | 5 | 6 | 7 | 8 |
| Thermal weight-loss temperature range | Room temperature ~30° C. | 31° C.~ 90° C. | 91° C.~ 160° C. | 161° C.~ 180° C. | 181° C.~ 200° C. | 201° C.~ 220° C. | 221° C.~ 250° C. | 251° C.~ 300° C. |

TABLE 1-continued

Capturing tube collection number and corresponding temperature range in the pyrolysis of tobacco material A

| | Capturing tube No. | | | | | | | |
|---|---|---|---|---|---|---|---|---|
| | 9 | 10 | 11 | 12 | 13 | 14 | 15 | 16 |
| Thermal weight-loss temperature range | 301° C.~ 340° C. | 341° C.~ 400° C. | 401° C.~ 420° C. | 421° C.~ 500° C. | 501° C.~ 550° C. | 551° C.~ 600° C. | 601° C.~ 650° C. | 651° C.~ 800° C. |

After the sixteen pyrolysis products are completely collected, they are rotated by the rotary collector, which moves along a linear slot between the cooling cavity and the heating cavity (e.g., horizontally). The collecting tube is fed into the heating cavity for thermal desorption, and nitrogen is used as the purging gas. The purging gas flow rate and thermogravimetric flow rate are consistent: 50 mL/min; start thermal desorption heating program: increase from room temperature to 900° C. at the rate of 20° C./s.

The separation device 31 is a gas chromatograph: the chromatographic column is a DB-5MS capillary column (30m×0.25 mm, 0.25 μm), inlet temperature is 250° C.; the carrier gas is helium; the gas flow rate is 0.8 mL/min; the injection volume is 1 μL; the split-flow ratio is 5:1; and the heating program conditions are as follows: an initial temperature of 50° C., hold for 10 min, increase to 280° C. at the rate of 10° C./min, and hold for 10 min.

The detection device 32 is a mass spectrometer; the ion source is an EI source, the ion source temperature is 230° C.; the solvent delay time is 7.5 min, the mass spectrometry scanning range is 30-450 amu; the electron energy is 70 eV; and the detection method is full scan.

Figure 3:
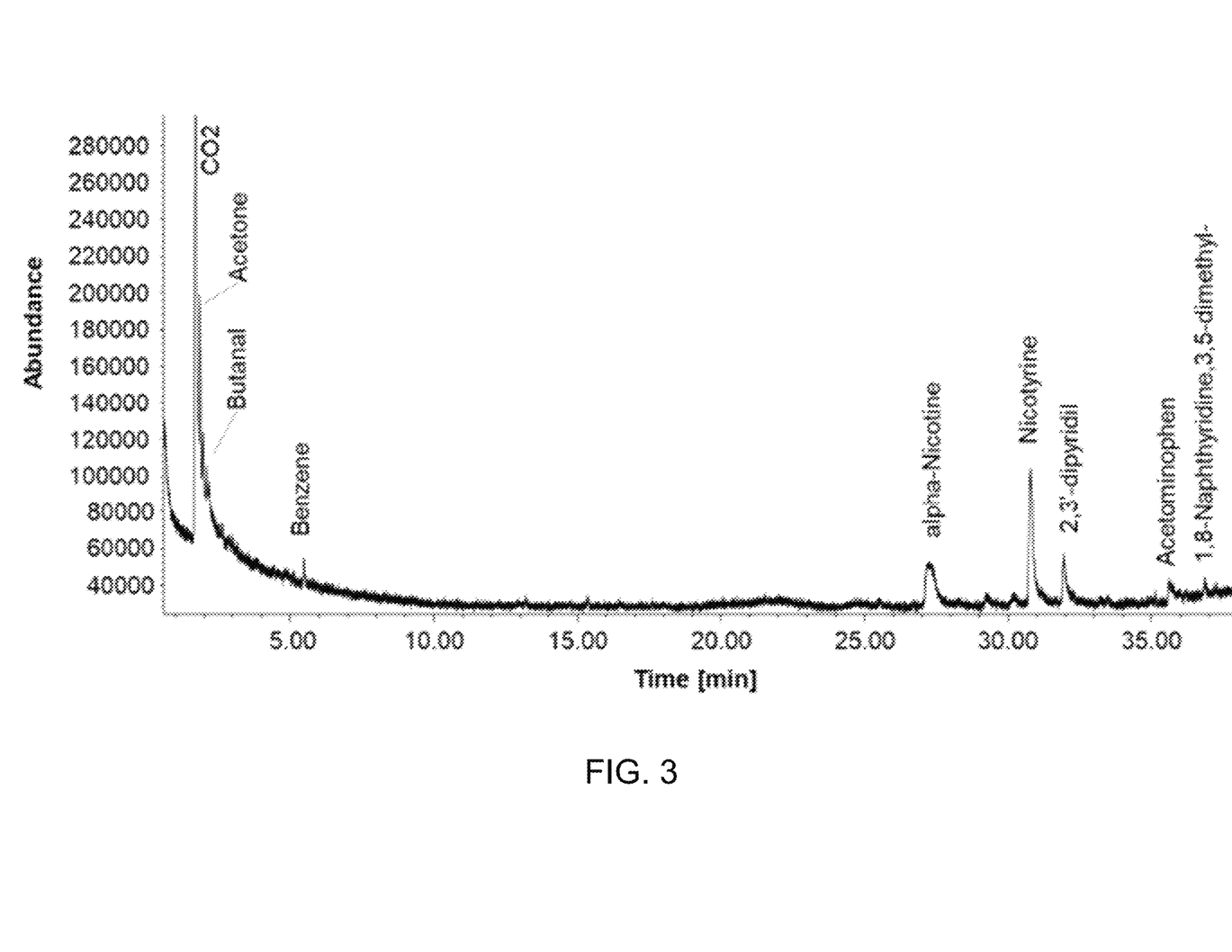
FIG. 3 shows total ion flow of pyrolysis products of a cigarette brand tobacco material A at 31° C.~90° C. of embodiment 1.
Figure 4:
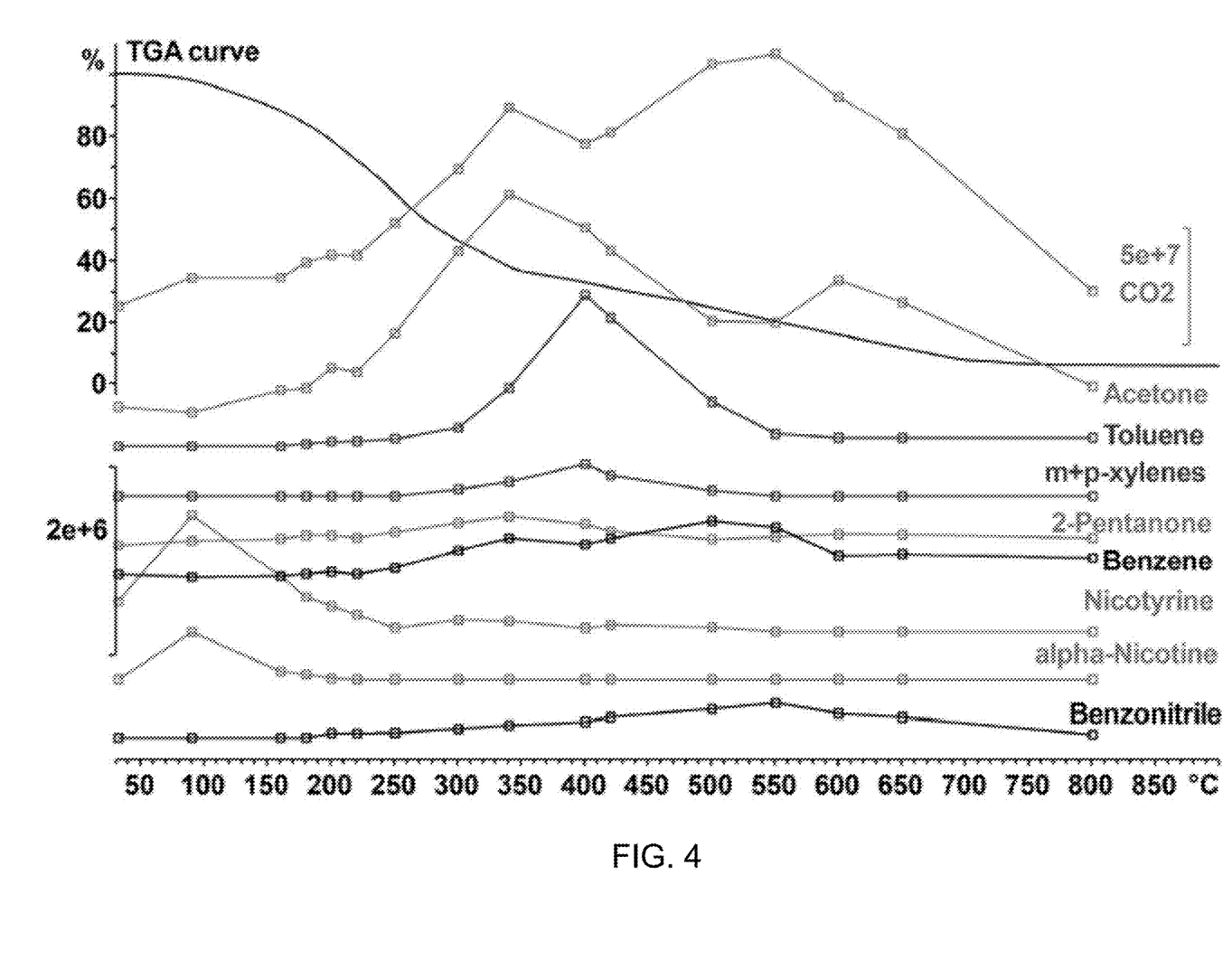
FIG. 4 shows changes of main pyrolysis product content of a cigarette brand tobacco material A from 30° C. to 900° C. of embodiment 1.

The total ion flow diagram of the pyrolysis products of tobacco material A heated to 31° C. — 900° C. is shown in FIG. 3., Changes in the main pyrolysis product content with changes in temperature from 30° C. to 900° C. are shown in FIG. 4.

Thus, the device of the present invention can detect and analyze real-time changes of pyrolysis products within a certain temperature range, as well as changes of pyrolysis product content with temperature changes. The above effects cannot be achieved by the prior art, thus the present device has unique advantages.

Embodiment 2: Real-Time Online Analysis of Pyrolysis of a Brand of Cigarette Tobacco Material B Using the Device of the Present Invention Before substance pyrolysis analysis, the pyrolyzing device 11 is kept at 800° C. for 10 min to remove impurities in the pyrolyzing device 11. A brand of cigarette tobacco material B weighing 5.00 mg is placed in the pyrolyzing device 11. The heating program is as follows: increase the initial temperature from 30° C. to 600° C. at the rate of 5° C./min, hold for 10 min. The carrier gas is air, and the carrier gas flow rate is 40 mL/min. Thermogravimetric, heat flux and derivative thermogravimetric analysis of the tobacco material B are shown in FIG. 5.

Figure 5:
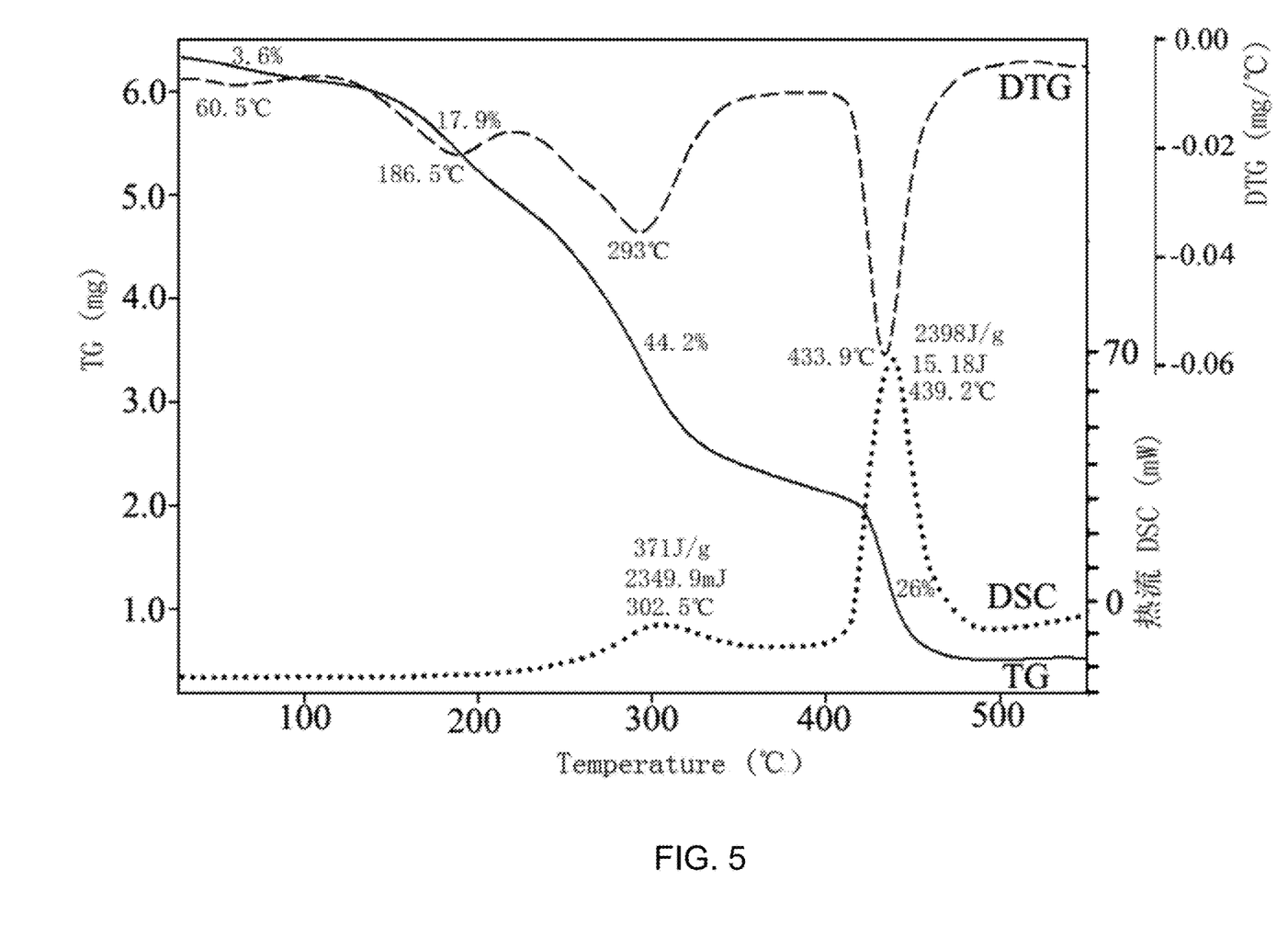
FIG. 5 shows thermogravimetric, heat flux and derivative thermogravimetric analysis of a cigarette brand tobacco material B of embodiment 2.

As is shown in FIG. 5, tobacco material B has four thermal weight-loss steps. The weight-loss ratio in each step is inconsistent: 3.6% for 30.3~106.3° C., 17.9% for 106.6~219.3° C., 44.2% for 219.3~392° C., and 26% for 392.2500° C. A program for collecting samples in each of eight temperature ranges is shown in Table 2. The device included and/or used eight collection tubes, and eight groups of pyrolysis products were collected at various temperature ranges during the heating program. The pyrolysis products in the collection tubes were rapidly cooled by liquid nitrogen at a cooling temperature of −40° C.

TABLE 2

Capturing tube collection number and corresponding temperature range in the pyrolysis of tobacco material B

| | Capturing Tube No. | | | | | | | |
|---|---|---|---|---|---|---|---|---|
| | 1 | 2 | 3 | 4 | 5 | 6 | 7 | 8 |
| Thermal weight-loss temperature range | 30~ 70° C. | 71~ 120° C. | 121~ 210° C. | 211~ 230° C. | 231~ 320° C. | 321~ 400° C. | 401~ 500° C. | 501~ 600° C. |

After collecting eight pyrolysis products, they are rotated by the rotary collector, and the collection tubes are successively fed into the heating cavity for thermal desorption, using nitrogen as the purging gas. The purging gas flow rate and the thermogravimetric flow rate are consistent: 40 mL/min. The thermal desorption heating program increased the temperature of the heating cavity from room temperature to 900° C. at the rate of 10° C./s.

The separation device 31 is a gas chromatograph, and the conditions are as follows: the chromatographic column is a DB-5MS capillary column (30 m×0.25 mm, 0.25 μm), the inlet temperature is 250° C.; the carrier gas is helium; the carrier gas flow rate is 0.8 mL/min.; the injection volume is 1 μL and the split-flow ratio is 5:1. The heating program is as follows: the initial temperature is 50° C., hold for 10 min, increase to 230° C. at the rate of 2° C./min, then increase to 250° C. at the rate of 10° C./min, and hold for 10 min.

The detection device 32 is a mass spectrometer; the ion source is an EI source, the ion source temperature is 230° C.; the quadrupole temperature is 150° C.; no solvent delay, the mass spectrometry scanning range is 30-450 amu; the electron energy is 70 eV; and the detection method is full scan.

Figure 6:
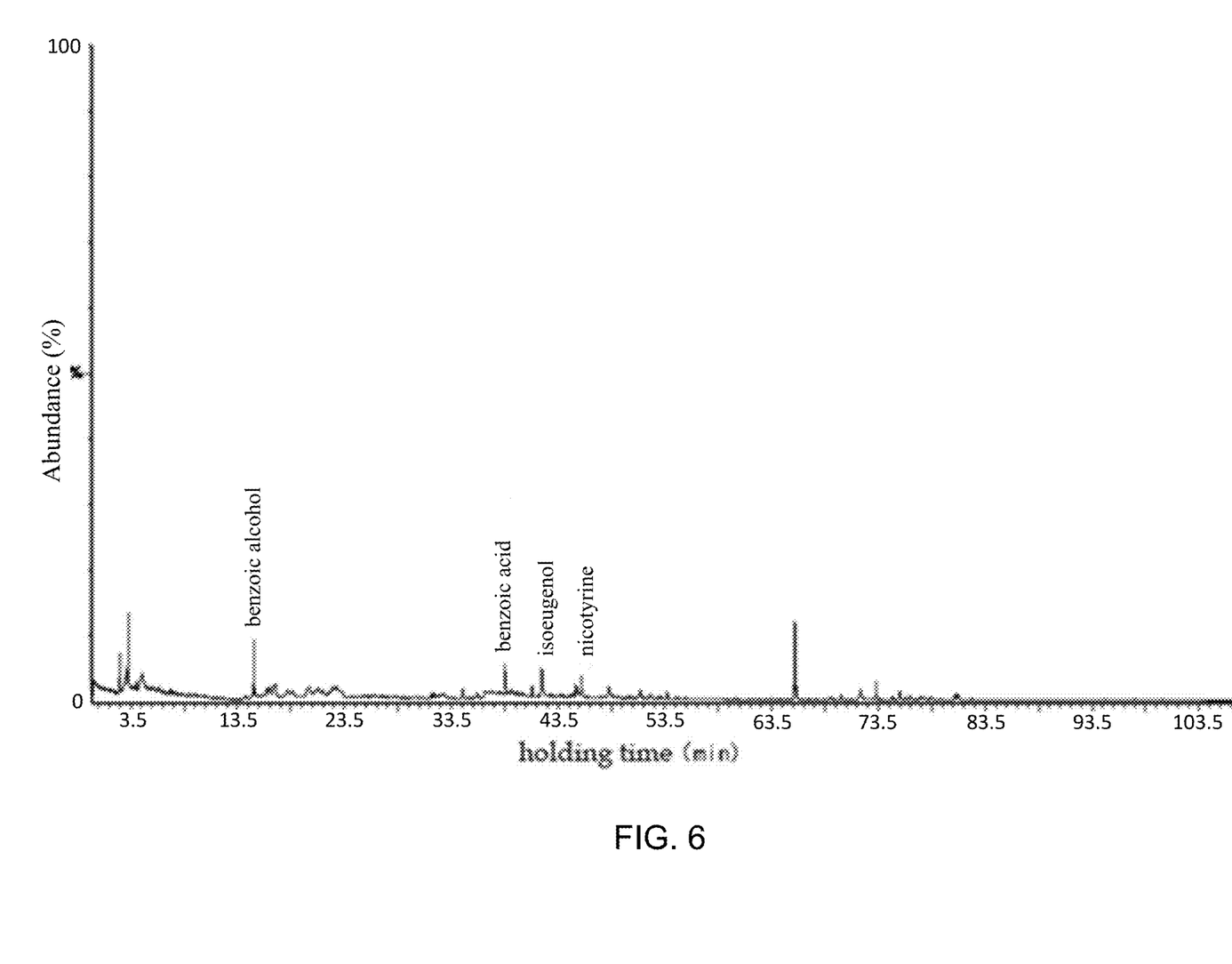
FIG. 6 shows the total ion flow of main pyrolysis products of a cigarette brand tobacco material B from 71° C. to 120° C. of embodiment 2.
Figure 7:
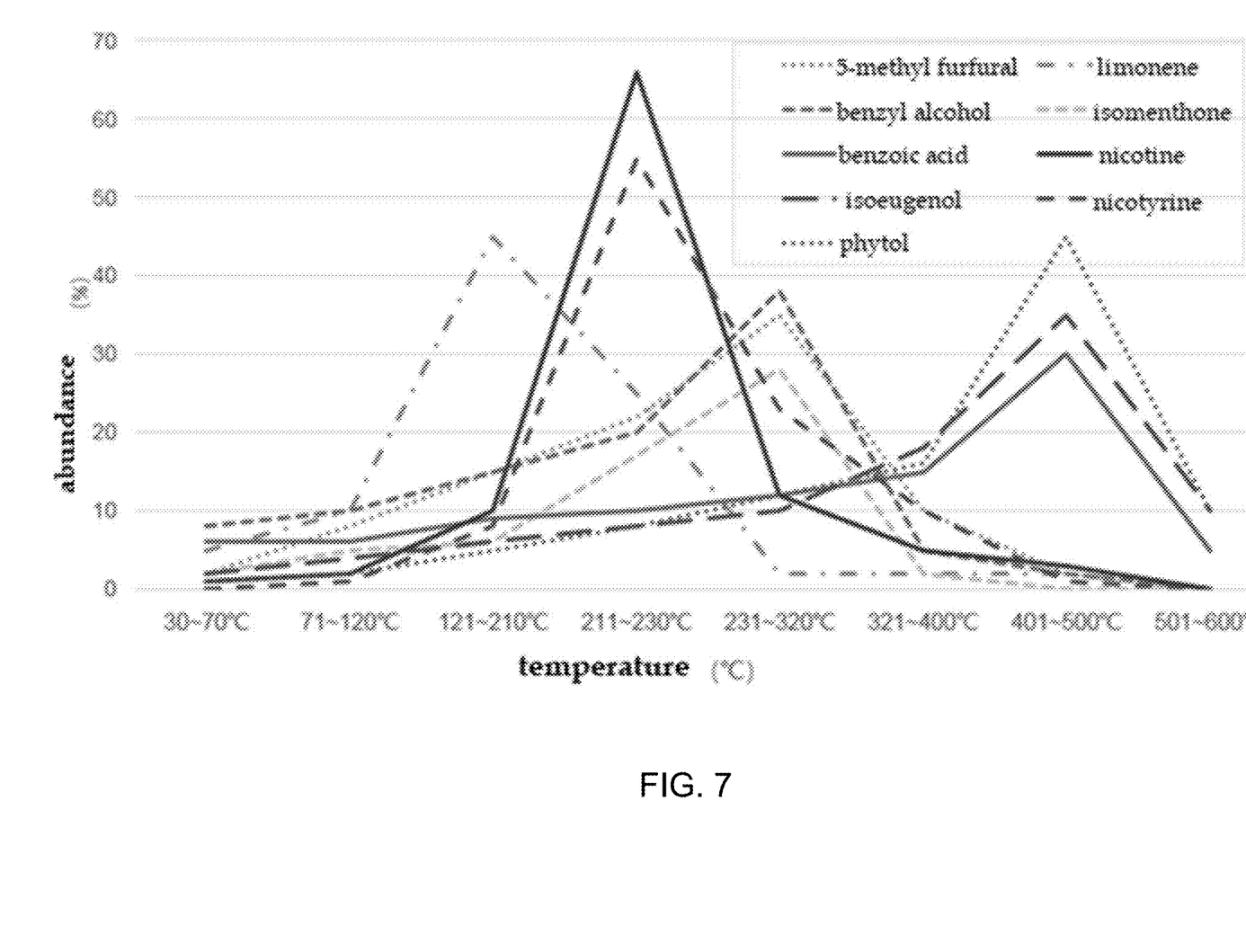
FIG. 7 shows changes of main pyrolysis product content of a cigarette brand tobacco material B from 30° C. to 600° C. of embodiment 2.

As to the tobacco material B, due to the use of cold-trap capture, as well as thermal desorption and thermal purge of the present invention, a total of 83 pyrolysis products including aldehydes, ketones, esters, organic acids, pyrazines, furanones and phenols are detected among the pyrolysis products. The total ion flow diagram of the pyrolysis products at 71° C.~120° C. is shown in FIG. 6; nine representative substances with high content are selected from the 83 pyrolysis products. The pyrolysis product content changes from 30° C. to 600° C. are shown in FIG. 7.

Therefore, it can be seen that pyrolysis products are captured and analyzed at four main weight-loss stages of thermogravimetric analysis using the real-time online analysis device of the present invention. Pyrolysis products of tobacco material B include the following substances in four main regions: region 1: limonene is mainly produced at 121~210° C.; region 2: nicotine and nicotyrine are mainly produced at 211~230° C.; region 3: 5-methylfuranaldehyde, benzyl alcohol and isomenthone are mainly produced at 231~320° C.; region 4: benzoic acid, isoeugenol and phytol are mainly produced at 401~500° C. The main pyrolysis products at the maximum weight-loss stage include benzoic acid, isoeugenol and phytol.

By using the device of the present invention, main pyrolysis products at four main weight-loss stages of the tobacco material B are determined, as well as their changes with the temperature. This cannot be achieved by the prior art.

Comparison: thermogravimetric-gas chromatography-mass spectrometry analysis of the brand of cigarette tobacco material B of the prior art.

Before substance pyrolysis analysis, the pyrolyzing device 11 is kept at 800° C. for 10 min to remove impurities in the pyrolyzing device 11. Tobacco material B weighing 5.00 mg is placed in the pyrolyzing device 11. The heating program is as follows: increase the initial temperature from 30° C. to 600° C. at the rate of 5° C./min, hold for 10 min. The carrier gas is air, and the carrier gas flow is 40 mL/min. Thermogravimetric, heat flux and derivative thermogravimetric analysis of a cigarette brand tobacco material B are shown in FIG. 5.

Figure 8:
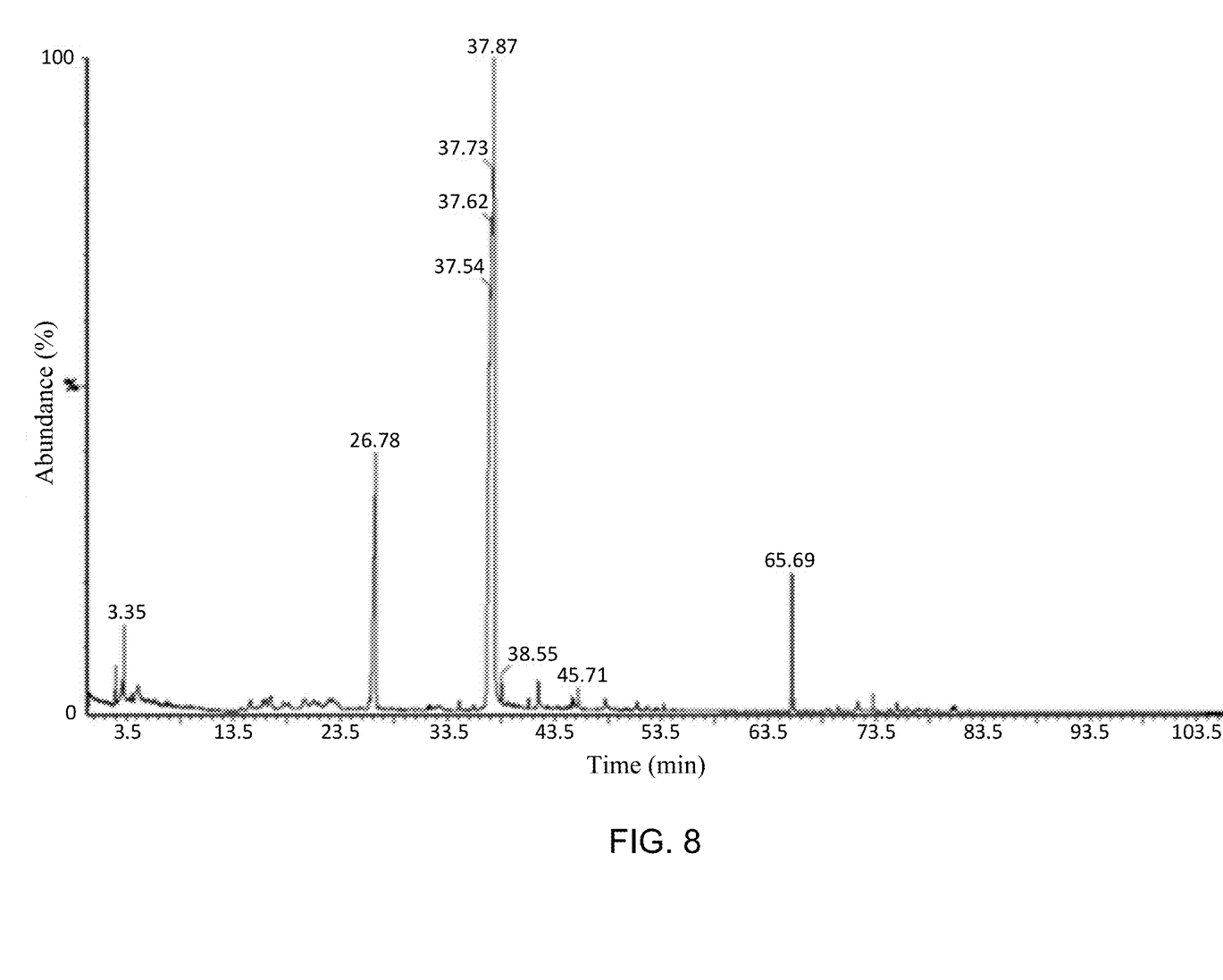
FIG. 8 shows total ion flow of main pyrolysis products of a cigarette brand tobacco material B from 30° C. to 600° C. of comparison 2.

The thermogravimetric pyrolysis products are directly separated and analyzed by gas chromatography-mass spectrometry. The total ion chromatogram is shown in FIG. 8. The same chromatograph and mass spectrometer as embodiment 2 were used, under the same conditions. The pyrolysis substances are shown in Table 3.

TABLE 3

All pyrolysis products of tobacco material B from 30° C. to 600° C.

| No. | Holding time (min) | Substance | Relative percentage content |
|---|---|---|---|
| 1 | 11.974 | 5-Methylfuranaldehyde | 0.05 |
| 2 | 16.245 | (−)-Limonene | 0.06 |
| 3 | 16.264 | Benzyl alcohol | 0.02 |
| 4 | 28.73 | N, N'-Dibenzoyloxyadipamide | 0.16 |
| 5 | 29.459 | 1,4:3,6-Dihydro-α-pyranose | 0.19 |
| 6 | 29.589 | Catechol | 0.18 |
| 7 | 30.15 | 5-Hydroxymethyl furaldehyde | 0.32 |
| 8 | 30.181 | α,α-4-Trimethylcyclohexyl methanol furfuryl alcohol | 19.69 |
| 9 | 30.324 | 2,3-Dihydrobenzofuran | 0.19 |
| 10 | 30.666 | (+)-Isomenthone | 0.36 |
| 11 | 31.113 | Glycerol monoacetate | 0.14 |
| 12 | 32.339 | Benzoic acid | 0.04 |
| 13 | 35.232 | 4-Vinyl-2-methoxyphenol | 0.25 |
| 14 | 37.476 | Nicotine | 69.64 |
| 15 | 38.429 | Solanone | 1.93 |
| 16 | 43.636 | Isoeugenol | 0.09 |
| 17 | 43.93 | Ethylvanillin | 0.18 |
| 18 | 45.344 | Nicotyrine | 0.13 |
| 19 | 52.768 | (4,5,5-Trimethyl-1,3-cyclopentadien-1-yl) benzene | 3.2 |
| 20 | 65.652 | Phytol | 2.11 |
| 21 | 65.82 | Fitone | 0.13 |
| 22 | 66.374 | Diisobutyl phthalate | 0.08 |
| 23 | 67.734 | Pentadecanal | 0.04 |
| | | Total number of compounds | 23 |

As is shown in FIG. 5, tobacco material B has four thermal weight-loss steps, and the weight-loss ratios in each step are inconsistent: 3.6% for 30.3~106.3° C., 17.9% for 106.6~219.3° C., 44.2% for 219.3~392° C., and 26% for 392.2500° C. The tobacco material B does not have an obvious weight-loss stage. Except that the weight-loss rate in the first stage is less than the other stages, the weight-loss rates at latter three stages are 20-45%. It shows that, the first temperature range may include volatilization (e.g., evaporation) of water. A large number of volatile substances are generated in the remaining three temperature ranges.

The pyrolysis products of the tobacco material B are analyzed by the thermogravimetric-gas chromatography-mass spectrometry technique of the prior art. All pyrolysis products go through GC/MS analysis at the same time. The total ion flow of the mass spectrometry process is shown in FIG. 8, and the pyrolysis products are shown in Table 3 above. By using the thermogravimetric-gas chromatography-mass spectrometry analysis of the prior art, part of the pyrolysis products (due to low content) brought by the carrier gas into the separation and detection system condense at various interfaces and pipelines of the system, and part are lost because their content or concentration is below the detection limit after being transported to the detection system, making it difficult for the device to identify them. Thus, only 23 substances are detected, much less than pyrolysis products detected by the present invention.

Meanwhile, the comparison does not respectively capture and analyze pyrolysis products at the four weight-loss stages (i.e., the four temperature ranges). It is impossible to recognize main pyrolysis products at the four main weight-loss stages and changes in the relative proportions of these products with changes in temperature.

It can be seen that, in the comparison, using the prior art technique only captures and analyzes all pyrolysis substances simultaneously, and cannot capture and analyze pyrolysis substances at a particular temperature point or temperature range, nor can it monitor changes in pyrolysis product content with changes in temperature. However, the device of the present invention can be used to detect and analyze real-time changes in the pyrolysis products at a certain temperatures or temperature ranges, as well as changes in the pyrolysis product content (e.g., proportion) with changes in temperature. The above effects cannot be achieved by the prior art, thus having unique advantages.

The above has shown and described basic principles, main features and advantages of the present invention. It should be understood by those skilled in the art that, the present invention is not limited by the above-mentioned embodiment, what is described in the above-mentioned embodiment and the description is only to illustrate the principle of the present invention, without departing from the spirit and scope of the present invention, the present invention may have various changes and improvements, which all fall within the scope of what is claimed. The claimed scope of the present invention is defined by the appended claims and their equivalents.

What is claimed is:

1. A real-time online analysis device for substance pyrolysis, comprising: a pyrolyzing system, a capturing system, a testing system and a controlling system; wherein the pyrolyzing system, the capturing system and the testing system are connected with the controlling system; the capturing system has a cooling cavity and a heating cavity, the cooling cavity has a temperature range from room temperature to −200° C., and the heating cavity has a temperature range from room temperature to 1000° C.;

wherein the capturing system further comprises:

a horizontal moving slot;

a cooling cavity at a first end of the horizontal moving slot, the cooling cavity having a cooling tube connected with a cooling gas device, and a first airtight connection with the pyrolyzing system through a first gas pipeline;

a heating cavity at a second end of the horizontal moving slot, the heating cavity having a heating tube and a second airtight connection with the testing system through a second gas pipeline;

a rotary collector on the horizontal moving slot, between the cooling cavity and the heating cavity, configured to slide along the horizontal moving slot towards the cooling cavity or the heating cavity;

a plurality of collecting tubes on or in the rotary collector, arranged radially around the rotary collector; and a purging gas pipe connected to the rotary collector.

2. The real-time online analysis device for substance pyrolysis according to claim 1, wherein the cooling gas device contains liquid nitrogen; and the temperature of the heating tube changes at a heating rate of 1° C./s~300° C./s.

3. The real-time online analysis device for substance pyrolysis according to claim 1, wherein the testing system comprises a separation device and a detection device; a first end of the separation device is connected with the heating cavity through the second gas pipeline, and a second end of the separation device is connected with the detection device.

4. The real-time online analysis device for substance pyrolysis according to claim 3, wherein the separation device comprises a gas chromatograph; and the detection device comprises a mass spectrometer.

5. The real-time online analysis device for substance pyrolysis according to claim 1, wherein the purging gas pipe transports a purging gas selected from nitrogen, helium and argon; and the purging gas flows at a rate of 0~2000 mL/min.

6. The real-time online analysis device for substance pyrolysis according to claim 1, comprising at least eight of the collection tubes.

7. A method for real-time online analysis of substance pyrolysis, using the device of claim 1, comprising:

placing one or more substances to be analyzed in the pyrolyzing device, programming the controlling system to change the temperature of the heating cavity to a set temperature or temperature range, heating the one or more substances at the set temperature point or temperature range to generate pyrolysis products;

moving the rotary collector along the horizontal moving slot towards the cooling cavity, and fully extending one of the plurality of collecting tubes into the cooling cavity, bringing the pyrolysis products into the one collecting tube with a carrier gas, cooling the carrier gas to condense the pyrolysis products and adsorb the pyrolysis products in the one collecting tube;

rotating the one collecting tube by 180° using the rotary collector, and moving the rotary collector along the horizontal moving slot towards the heating cavity;

fully extending the one collecting tube with pyrolysis products therein into the heating cavity, heating the heating cavity to thermally desorb the pyrolysis products from the one collecting tube, feeding the pyrolysis products using a purging gas from the purging gas pipe into a separation device to generate separated pyrolysis products, analyzing the separated pyrolysis products online with a detection device; and pyrolyzing the one or more substances at additional temperatures or temperature ranges to generate additional pyrolysis products; and otherwise repeating the above steps to obtain real-time online analysis of substance pyrolysis at a plurality of set temperatures or temperature ranges.

* * * * *